US012109159B2

(12) United States Patent
Cagner et al.

(10) Patent No.: US 12,109,159 B2
(45) Date of Patent: Oct. 8, 2024

(54) PATIENT TRANSFER DEVICE

(71) Applicant: Njord International AB, Gothenburg (SE)

(72) Inventors: Barbro Cagner, Alingsås (SE); Jacob Ahrnstein, Gothenburg (SE); Daniel Thunström, Mölndal (SE); Lukas Jönsson, Lindome (SE)

(73) Assignee: Njord International AB, Gothenburg (SE)

( * ) Notice: Subject to any disclaimer, the term of this patent is extended or adjusted under 35 U.S.C. 154(b) by 284 days.

(21) Appl. No.: 17/624,562

(22) PCT Filed: Jul. 2, 2020

(86) PCT No.: PCT/SE2020/050702

§ 371 (c)(1),
(2) Date: Jan. 3, 2022

(87) PCT Pub. No.: WO2021/006799

PCT Pub. Date: Jan. 14, 2021

(65) Prior Publication Data

US 2022/0273510 A1 Sep. 1, 2022

(30) Foreign Application Priority Data

Jul. 5, 2019 (SE) .................................... 1950858-9

(51) Int. Cl.
*A61G 7/10* (2006.01)

(52) U.S. Cl.
CPC .................................. *A61G 7/1026* (2013.01)

(58) Field of Classification Search
USPC ......................................... 184/6.12, 15.1, 16
See application file for complete search history.

(56) References Cited

U.S. PATENT DOCUMENTS 4,296,837 A * 10/1981 Charlton .................. H02G 1/08 184/15.1
5,022,493 A * 6/1991 Buckelew ............... A47L 25/00 15/210.1

(Continued)

FOREIGN PATENT DOCUMENTS

| | | | |
|---|---|---|---|
| CN | 206886407 | U | 1/2018 |
| EP | 1584252 | A1 | 12/2005 |
| WO | WO-0023026 | A2 | 4/2000 |

OTHER PUBLICATIONS

International Search Report and Written Opinion received for PCT/SE2020/050702, dated Aug. 21, 2020.

(Continued)

*Primary Examiner* — Adam C Ortiz
(74) *Attorney, Agent, or Firm* — Silver Legal LLC; Jarrett L. Silver

(57) ABSTRACT

A patient transfer device for transferring a patient placed on a movable sheet from a first surface to a receiving surface, said patient transfer device including first and second laterally spaced apart retractable pulling members, at least one motor operatively connected to the pulling members so as to allow retraction of the pulling members by means of the motor, where the pulling members comprise a bobbin and a wire, where the patient transfer device comprises an absorbent member removably arranged around the wire. Accordingly, the wire may be cleaned in a reliable manner.

9 Claims, 2 Drawing Sheets

(56) References Cited

U.S. PATENT DOCUMENTS

| | | | | |
|---|---|---|---|---|
| 7,571,498 | B2 | 8/2009 | Jewell et al. | |
| 2003/0074732 | A1 | 4/2003 | Hanson et al. | |
| 2003/0110559 | A1 * | 6/2003 | Weigand | A61G 7/1044 5/81.1 R |
| 2004/0168859 | A1 * | 9/2004 | Coder | H02G 1/086 184/105.1 |
| 2006/0090258 | A1 * | 5/2006 | Stryker | A61G 7/1026 5/81.1 R |
| 2006/0273292 | A1 * | 12/2006 | Milam | B66D 3/20 254/343 |
| 2010/0235986 | A1 * | 9/2010 | Klyne | A61G 7/1026 5/81.1 R |

OTHER PUBLICATIONS

European Search Report in App. No. EP 20 83 6045.3, Mailed Jun. 20, 2023, EPO (The Hague, Netherlands), Search Completed Jun. 12, 2023.

Takimoto, Ayana, Notice of Reasons for Refusal in Japanese Patent Application No. 2021-576922, Issued Jan. 29, 2024, Japanese Patent Office.

Examiner Roni Bravdo, Notice of Deficiencies for Patent Application 289329, Israel Patent Office, Jun. 17, 2024.

* cited by examiner

PATIENT TRANSFER DEVICE

TECHNICAL FIELD

The present invention relates to a patient transfer device adapted to transfer a patient from a first surface to a receiving surface.

BACKGROUND ART

In hospitals, care facilities, and other settings, certain situations require that patients are transported from one surface to an adjoining surface, such as from one bed to an adjoining bed or to an operating table. This manoeuvre may either be done manually, requiring the cooperation of several nurses or other professionals, or by means of a patient transfer device. Patient transfer devices configured to move a patient from one surface to another are generally known.

Specifically, a patient transfer device for transferring a patient placed on a movable sheet on a first hospital bed to a second, receiving hospital bed is known from US2006090258. This patient transfer device comprises a base, a motor attached to the base, two straps connected to the motor such that these are retractable by means of the motor, and a clamping assembly releasably attachable to a sheet. Thus, the patient transfer device may be arranged on one side of a receiving hospital bed, opposite the first hospital bed, and connected to a sheet on which a patient lies. The clamping assembly may then be used in connection with the motor and the two straps to pull a sheet on which a patient lies from the first bed to the second, receiving bed.

However, the use of many of these devices often involve labour intensive, time consuming and/or ergonomically challenging steps. There is therefore a need for an improved patient transfer device.

DISCLOSURE OF INVENTION

An object of the invention is therefore to provide an improved patient transfer device where regular cleaning is simplified.

The solution to the problem according to the invention is described in the characterizing part of claim 1. The other claims contain advantageous embodiments and further developments of the patient transfer device.

In a patient transfer device for transferring a patient placed on a movable sheet from a first surface to a receiving surface, said patient transfer device comprising: a first and a second laterally spaced apart retractable pulling members, where a pulling member comprises a bobbin and a retractable wire, at least one motor operatively and mechanically connected to bobbin of the pulling members so as to allow retraction of the wire by means of the motor, and a sheet holding arrangement that is connected or connectable to the wire of the pulling members and that is configured to attach and hold the sheet in place in relation to the sheet holding arrangement so as to allow transfer of the patient by arranging the patient transfer device and the first surface on opposite sides of the receiving surface and simultaneously retracting the wires so that the sheet, and thereby also the patient, is pulled from the first surface to the receiving surface, the object of the invention is achieved in that the patient transfer device comprises an absorbent member removably arranged around the wire.

By this first embodiment of the patient transfer device according to the invention, a patient transfer device that can be cleaned continuously is provided. By arranging an absorbent member around the pulling wire, the absorbent member can hold a cleaning liquid that cleans the wire every time the wire is pulled out from the patient transfer device or is retracted back into the patient transfer device. It is important to clean the wire in both directions, in order to be sure that no contaminations remains on the wire. Contaminations may otherwise contaminate the bobbin on which the wire is wound, which may be transferred to another patient.

The absorbent member is preferably circular and longitudinal, such that the contact surface to the wire is large. The absorbent member may be wet manually at predefined times, or may be provided with an automatic wetting arrangement that applies a specified amount of cleaning liquid on the absorbent member at predefined intervals.

The absorbent member is in one example provided with a slit extending from the outer surface of the absorbent member to the centre of the absorbent member. The slit will allow the absorbent member to be removed easily without having to detach the wire. Since the absorbent member will wear through the sliding contact with the wire, the absorbent member may in this way easily be replaced with a new absorbent member.

The absorbent member may be held in the patient transfer device by an insert. The insert is a tube shaped holder that encloses the absorbent member. The absorbent member and/or the insert is preferably arranged in a pad of the patient transfer device. The pad is adapted to bear on a frame of the receiving surface, and may be somewhat resilient. The insert will prevent cleaning liquid to leak to the pad. The insert is preferably provide with an attachment means comprising a thread or a bayonet, such that the absorbent member can be held securely in position in the pad. The insert may also be provided with a slit such that the insert can be easily replaced if it is worn.

The insert and/or the absorbent member is preferably arranged in a hole in the pad. In this way, the absorbent member is securely held in place in the pad, and it is ensured that the wire is surrounded by the absorbent member, such that the complete wire is cleaned by the absorbent member. The pad may also be provided with a slit through which the wire may pass. In this way, the wire may easily be removed from the patient transfer device without having to thread the wire through the hole.

The bobbin holding the wire may also be removable. This allows the bobbin with the wire to be removed for e.g. disinfection when necessary. In one example, the absorbent member is soaked with a cleaning liquid every day in order to clean the wire, and the bobbin and the wire is removed once a week for an additional cleaning process. The bobbin is preferably symmetrical such that it can be used on both sides of the motor of the patient transfer device.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
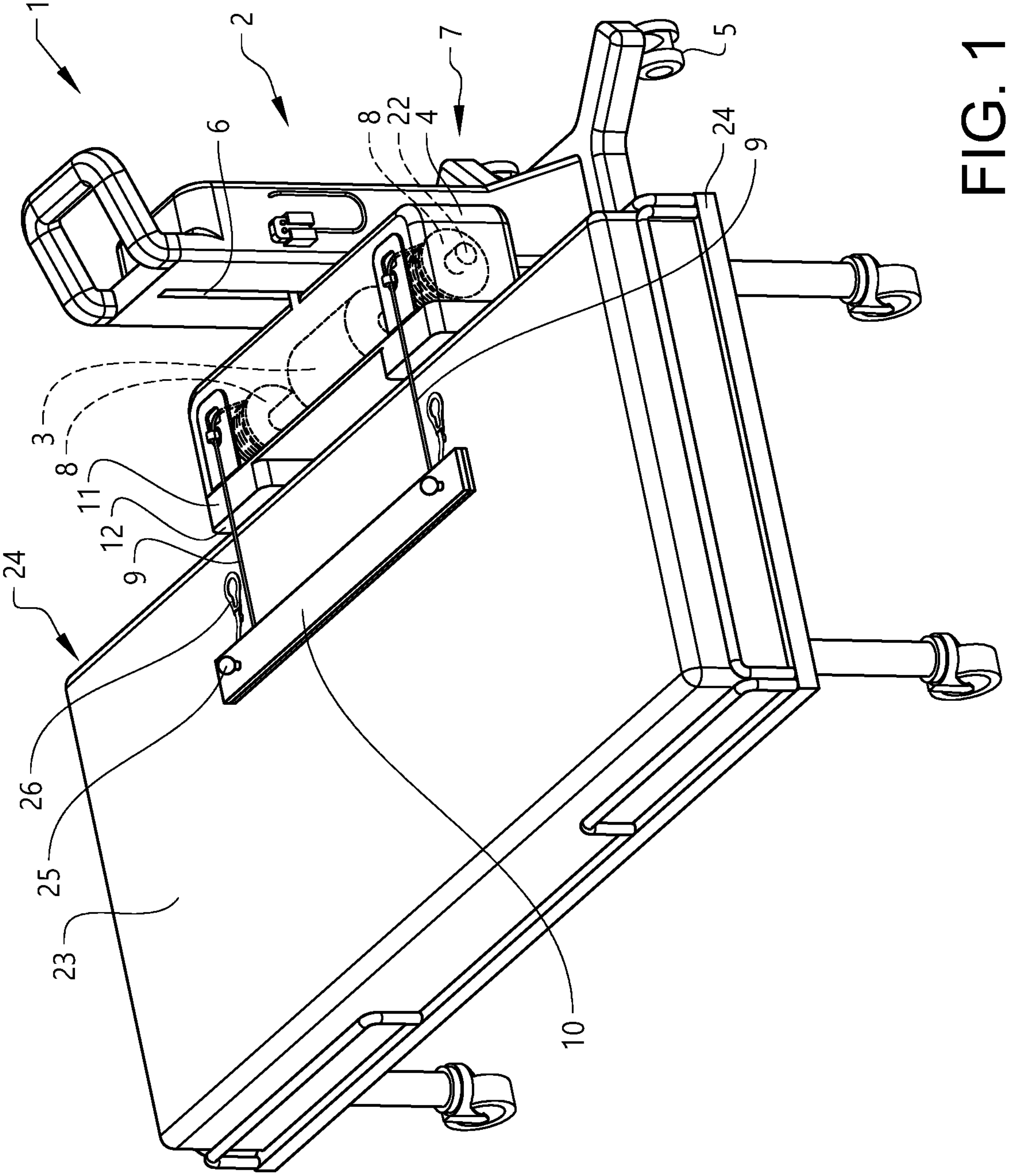
FIG. 1 shows a patient transfer device according to the invention.
Figure 2:
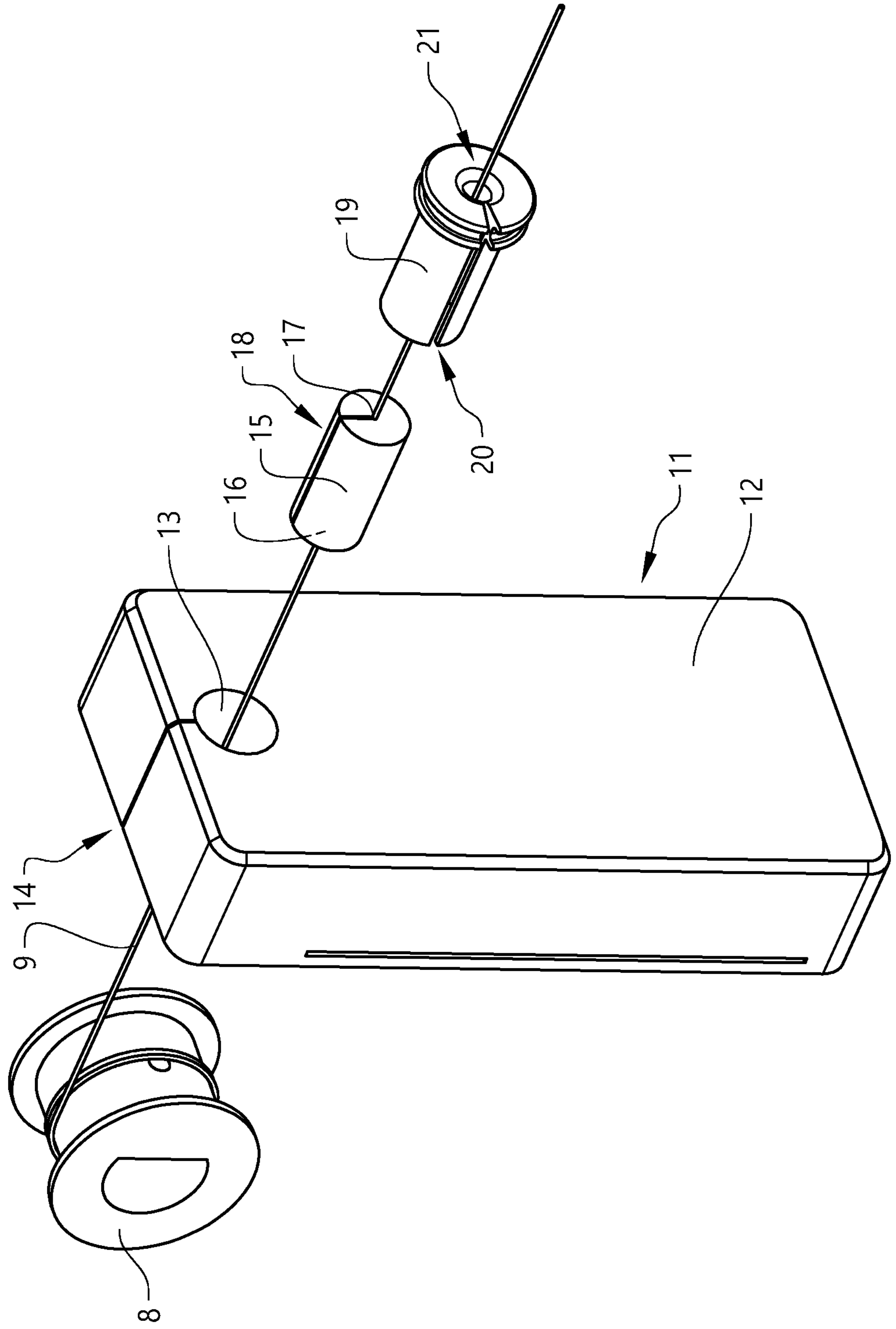
FIG. 2 shows a detail of the patient transfer device according to the invention.

FIG. 1 shows a view of a patient transfer device according to the invention arranged next to a receiving surface, and FIG. 2 shows a detail of the patient transfer device.

The patient transfer device 1 comprises in the shown example a frame 2, onto which a motor 3 is attached. The frame 2 shown in FIG. 1 is arranged to be placed on a horizontal surface, such as a floor, and is provided with wheels 5 for moving the patient transfer device 1 across this surface. The frame 2 comprises an outer casing 4 that covers and protects the motor 3 and the wire bobbins 8 from contamination caused by for example contact with dust or bodily fluids from a patient that is transferred using this patient transfer device 1.

The patient transfer device 1 may further comprise an inner casing arranged to cover only the motor 3 but not the wire bobbins 8. In this way, a user may remove the outer casing to replace or clean the wire bobbins without the risk of touching or contaminate the motor. The outer casing may be removed completely or may be attached to the frame 2 with hinges, such that the outer casing is tilted away from the inner casing when the wire bobbins are to be cleaned or replaced. The pads 11 may be attached to the outer casing in a removable manner, such that they may be removed from the outer casing before the outer casing is tilted or removed.

The patient transfer device 1 comprises means for vertically adjusting the position of the motor 3 and the outer casing 4 that covers it. This may for example be an electrical motor (not shown) arranged to move the motor 3 and the outer casing 4 along a vertical track 6 or groove in the frame 2. This simplifies the use of the patient transfer device 1 in certain situations where the height of the receiving surface 23 may vary.

The motor 3 is coupled to two laterally spaced apart retractable pulling members 7 that are used when pulling a patient from a first surface to a receiving surface 23. A pulling member comprises a bobbin 8 and a wire 9 wound on the bobbin. The bobbin 8 is mechanically connected to the motor 3, either directly to the motor or to a shaft driven by the motor. The ends of the two wires 9 that are not connected to the bobbin 8 are attached to a sheet holding arrangement 10, which is shaped as an elongated beam that extends between the respective ends of the wires 9.

The sheet holding arrangement 10 comprises a first elongated member that is releasably connected to a second elongated member, which in turn is fixedly attached to the two ends of the wire 9 as described above. The first elongated member of the sheet holding arrangement 10 is provided with connection means for releasably connecting it to the second elongated member, to which the two wires 9 are attached. The elongated sheet holding arrangement 10 is beam shaped and thus allows load from pulling a sheet on which a patient lies to be distributed to both wires 9. The sheet holding arrangement 10 shown in FIG. 1 has two protruding members 25 and two loop elements 26 each of which is provided with an opening through which a protruding member 25 can be at least partly inserted in order to hold a sheet in place there between. The protruding member 25 of the sheet holding arrangement 10 is in the shown example mushroom shaped, having a head portion of a first protrusion width and a neck portion of a second, smaller width than the head portion. The neck portion is located closer to the elongated member than the head portion. The opening in the loop element is keyhole-shaped, having a first portion of a first opening width, and a second portion of a second, smaller width. Thus, the head portion of the protruding member 25 may be inserted into the first portion of the opening and then moved to the second portion of the opening, such that the width of the head portion of the protruding member 25 prevents the protruding member from exiting the second portion of the opening. This allows a sheet to be attached to the sheet holding arrangement 10 by arranging it between the protruding member 25 and the opening of the loop element 26 before the protruding member 25 enters the opening. In this way, the sheet will be held in a secure way by the sheet holding arrangement. The sheet holding arrangement 10 may be retracted by the motor 3 that is arranged inside the frame 2 of the patient transfer device 1.

FIG. 2 shows a detail of the patient transfer device 1. In this figure, the pad 11, the bobbin 8, the wire 9, the absorbent member 15 and the insert 19 are shown. The pad 11 comprises a bearing surface 12 adapted to bear on a frame of e.g. a bed on which the receiving surface is positioned. The pad may be somewhat resilient. The patient transfer device comprises in the shown example two separate pads 11, but one longer pad may also be used. The pad 11 comprises a hole 13 that is adapted to hold the absorbent member 15 arranged in the insert 19. The hole 13 is preferably provided with an attachment means comprising a thread or a bayonet, to which a corresponding attachment means of the insert may connect, such that the absorbent member can be held securely in position in the pad. The pad may also comprise a slit 14 through which the wire may be passed, such that the pad may be removed from the outer casing without having to thread the wire through the hole. This simplifies the removal of the pad from the outer casing.

By arranging an absorbent member around the wire, the absorbent member can hold a cleaning liquid that cleans the wire every time the wire is pulled out from the wire bobbin or is retracted back onto the wire bobbin. It is important to clean the wire in both directions, in order to be sure that no contaminations remains on the wire. Contaminations may otherwise contaminate the bobbin on which the wire is wound, which may be transferred back to the wire.

The absorbent member 15 is preferably circular and longitudinal, such that the contact surface to the wire is relatively long. The absorbent member may be wet manually at predefined times, e.g. once a day, or may be provided with an automatic wetting arrangement that applies a specified amount of cleaning liquid on the absorbent member at predefined intervals. The absorbent member may be made from a foam material or a textile material and is adapted to hold a cleaning liquid and to distribute the cleaning liquid to the wire when the wire passes through the absorbent member. The absorbent member may also be made from two different materials, one more rigid close to the wire and one more absorbent applied around the rigid material, in order to increase the wear resistance of the absorbent member.

The absorbent member is in one example provided with a slit extending from the outer surface of the absorbent member to the centre of the absorbent member. The slit will allow the absorbent member to be removed easily without having to detach the wire. Since the absorbent member will wear through the sliding contact with the wire, the absorbent member may in this way easily be replaced with a new absorbent member. The absorbent member may also comprise two semi-circular parts that together forms the absorbent member.

The absorbent member may be arranged in the pad in different ways. In the shown example, the absorbent member is held in the pad by an insert 19. The insert is in the shown example a tube shaped holder with a closed end. The insert encloses the absorbent member, and is provided with a hole 21 at its closed end through which the wire passes. The insert will hold the absorbent member in place such that it is not displaced by the wire when the wire passes through the absorbent member. The insert will also prevent cleaning liquid to leak to the pad. The insert is preferably provide with an attachment means comprising a thread or a bayonet, such that the absorbent member can be held securely in position in the pad. The insert may also be provided with a slit 20 such that the insert can be easily replaced if it is worn. In the shown example, the absorbent member 15 is arranged in parallel with the wire 9. It would also be possible to arrange the absorbent member perpendicular to the wire, such that the absorbent member is positioned in a hole extending from the top of the pad.

The bobbin 8 holding the wire 9 is preferably also removable. This allows the bobbin with the wire to be removed from the axle member 22 of the motor 3 for e.g. disinfection when necessary. In one example, the absorbent member is soaked with a cleaning liquid every day in order to clean the wire, and the bobbin and the wire is removed once a week for an additional cleaning process. The bobbin is preferably symmetrical such that it can be used on both sides of the motor of the patient transfer device.

The invention is not to be regarded as being limited to the embodiments described above, a number of additional variants and modifications being possible within the scope of the subsequent patent claims. The patient transfer device may have any size and may be made from any suitable material.

REFERENCE SIGNS

1: Patient transfer device
2: Frame
3: Motor
4: Casing
5: Wheel
6: Vertical track
7: Pulling member
8: Bobbin
9: Wire
10: Sheet holding arrangement
11: Pad
12: Bearing surface
13: Hole
14: Slit
15: Absorbent member
16: Outer surface
17: Centre of absorbent member
18: Slit
19: Insert
20: Slit
21: Hole
22: Axle member
23: Receiving surface
24: Frame
25: Protruding member
26: Loop element

The invention claimed is:

1. A patient transfer device for transferring a patient placed on a movable sheet from a first surface to a receiving surface, said patient transfer device comprising: a first and second laterally spaced apart pulling members, where a pulling member comprises a bobbin and a retractable wire, at least one motor operatively and mechanically connected to the bobbin of the pulling members so as to allow retraction of the wire means of the motor and a sheet holding arrangement that is connected or connectable to the wire of the pulling members and that is configured to attach and hold the sheet in place in relation to the sheet holding arrangement so as to allow transfer of the patient by arranging the patient transfer device and the first surface on opposite sides of the receiving surface and simultaneously retracting the wires that the sheet, and thereby also the patient, is pulled from the first surface to the receiving surface, wherein the patient transfer device comprises an absorbent member removably arranged around the wire; wherein the bobbin with the wire is removable from the patient transfer device; wherein the patient transfer device comprises a pad arranged on the patient transfer device where the pad is adapted to bear on a frame of the receiving surface, where the pad comprises a hole adapted to hold the absorbent member and/or insert.

2. The patient transfer device according to claim 1, wherein the absorbent member is cylindrical and longitudinal and is provided with a slit extending from an outer surface to the center of the absorbent member, such that the absorbent member may be replaced without removing the wire.

3. The patient transfer device according to claim 1, wherein the patient transfer device comprises an insert adapted to hold the absorbent member.

4. The patient transfer device according to claim 3, wherein the insert comprises attachment means adapted to attach the insert to the patient transfer device.

5. The patient transfer device according to claim 3, wherein the insert is provided with a slit, such that the insert may be replaced without removing the wire.

6. The patient transfer device according to claim 1, wherein the pad is provided with a slit such that the pad may be replaced without removing the wire.

7. The patient transfer device according to claim 1, wherein the bobbin is symmetrical such that the bobbin can be mounted on either side of the motor.

8. The patient transfer device according to claim 1, wherein the patient transfer device comprises an outer casing arranged to cover the bobbin and the motor.

9. The patient transfer device according to claim 8, wherein the patient transfer device comprises an inner casing arranged to cover the motor.

* * * * *